United States Patent Office 3,109,001
Patented Oct. 29, 1963

3,109,001
METHOD FOR THE PREPARATION OF NON-HYGROSCOPIC CRYSTALLINE THIOBARBITURATE SALTS
William L. Hartop, Jr., Waukegan, Ill., assignor to Abbott Laboratories, North Chicago, Ill., a corporation of Illinois
No Drawing. Filed Aug. 24, 1959, Ser. No. 835,447
5 Claims. (Cl. 260—260)

This invention relates generally to a new form of water-soluble salt of therapeutically useful thiobarbituric acid derivatives and particularly to a substantially non-hygroscopic, stable, crystalline, water-soluble, sodium salt of thiopental and to a method of preparing the same.

Thiopental sodium, thiamylal sodium, thialbarbitone sodium and other similar therapeutically useful thiobarbituric acid derivatives when used for inducing surgical anesthesia are generally administered intravenously as a dilute aqueous solution of the sodium salts thereof. Since these derivatives including thiopental sodium are stable only in the anhydrous form and since the aqueous solutions thereof are relatively unstable and decompose within a relatively short time, it has been the general practice to hold these sodium salts in a sealed container as a dry powder and then add thereto sufficient water to form the desired dilute aqueous solution just before use. It, thus, is very important that the said salts remain free of all moisture during storage and until dissolved in water just prior to administration. It is also highly desirable that these salts be very readily soluble in water in order to facilitate the rapid preparation of the aqueous solutions of uniform concentration.

Of the many thiobarbituric acid derivatives which are used as anesthetic agents, thiopental sodium is perhaps the most widely used for the induction of surgical anesthesia of relatively short duration. Thiopental sodium is the sodium salt of 5-ethyl-5-(1-methylbutyl)-2-thiobarbituric acid and is generally represented by the following structural formula:

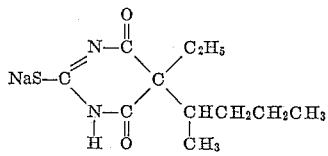

Thiopental sodium is defined as "a yellowish-white, hygroscopic powder" (U.S. Pharmacopoeia). Although thiopental acid has been isolated as a crystalline solid, thiopental sodium has heretofore been commercially available only as an amorphous, hygroscopic solid which is difficult to purify and so deliquescent that it will absorb enough moisture at normal room conditions of relative humidity to liquefy in a few hours. Also, some of the thiobarbiturates, such as thiopental sodium, have been recovered from alcohol solutions as crystalline solids, but these crystals are hygroscopic and absorb moisture from the atmosphere to such an extent that they soon dissolve. Moreover, these crystals obtained from an alcohol solution on drying in the usual manner lose alcohol of crystallization and immediately revert to the amorphous salt form having the above-described properties.

It is, therefore, an object of the present invention to provide a substantially non-hygroscopic salt of a water-soluble, therapeutically useful, thiobarbituric acid derivative.

It is also an object of the present invention to provide a non-hygroscopic salt of a therapeutically useful thiobarbituric acid derivative which will dissolve very rapidly in water.

It is another object of the invention to provide an alkali metal salt of a therapeutically useful thiobarbituric acid derivative in a form which can be more conveniently highly purified than has heretofore been possible.

It is a further object of the present invention to provide a non-toxic, alkali metal salt of a therapeutically useful thiobarbituric acid derivative in a crystalline form.

It is another object of the invention to provide a substantially non-hygroscopic, crystalline, thiopental sodium salt.

It is another object of the invention to provide a crystalline thiamylal sodium salt.

It is another object of the invention to provide a crystalline thialbarbitone sodium salt.

It is still another object of the invention to provide a sodium salt of a therapeutically useful thiobarbiturate derivative in a form which will remain for prolonged periods as a stable non-hygroscopic salt but, which when water is added thereto will dissolve very rapidly.

Another object of the present invention is to provide a method for the preparation of these stable, crystalline, non-hygroscopic salts of thiobarbituric acid.

Other objects of the present invention will be apparent to those skilled in the art from the detailed description and claims to follow.

It has been found that the foregoing and other objects of the present invention can be achieved by subjecting the conventional yellowish-white, hygroscopic, amorphous alkali metal salts of the therapeutically useful thiobarbiturates, such as thiopental sodium, to treatment with a crystallization solvent, such as an alkyl ether, an alkyl ester or an alkyl ketone in the liquid or vapor phase for a period sufficient to cause the said thiopental to be transformed into a white, crystalline, stable substantially non-hygroscopic salt having a granular appearance and which does not liquefy when left exposed to approximately 50% relative humidity for many hours. Where the crystallization solvent used has a low solubility for the thiopental salt, it is desirable to add to the crystallization solvent a small percentage of a solvent in which the thiopental salt is soluble to speed up the conversion to the crystalline salt. The treated salts are preferably dried under vacuum of about 25 inches mercury at temperatures of about 60°–70° C. to remove all traces of solvent.

The treatment of therapeutically useful thiobarbiturate salts can be effectively carried out, for example, by contacting an amorphous thiopental salt, such as thiopental sodium, with a relatively small volume of the crystallization solvent, such as ethyl ether, ethyl acetate, or methyl propyl ketone in a proportion of about 10 ml. of solvent per gram of thiopental salt. While the temperature at which the solvent contacts the amorphous thiopental salt is not critical, since satisfactory results have been obtained at temperatures as low as 4° C. and as high as 60° C.; it has been found that treatment at room temperature or below produces a higher grade product. The time of treatment varies considerably, however, depending on which particular crystallization solvent is used and the concentration of the thiopental salt in the solvent. Also, where a crystallization solvent is used in which the thiopental salt is relatively insoluble, the addition thereto of a small amount of a solvent in which the thiopental salt is soluble will greatly increase the speed of the crystallization process. Under any of the numerous conditions of treatment, however, the completion of the conversion of an amorphous thiopental salt to a non-hygroscopic, crystalline form is indicated by the transformation of the entire mass from an original yellowish-appearing, hygroscopic solid to a uniformly white, non-hygroscopic solid which has a significantly high degree of purity than the initial salt. Care should always be taken to break up any large clumps of thiopental material during treatment in order to insure intimate contact with the crystallization solvent and thereby effect complete conversion to the crystalline form in as short a period as possible.

The time of treatment required for the complete conversion of the said thiobarbiturates, such as thiopental sodium, to the non-hygroscopic crystalline form varies considerably with the choice of the crystallization solvent, although the final product produced is the same. For example, when ethyl acetate at room temperature is used as the crystallization solvent in the ratio of 5 cc. of solvent for each gram of thiopental salt, all of the thiopental dissolves almost immediately. Within a few minutes the solution becomes hazy and, within about 15 minutes, a heavy white precipitate of the crystalline thiopental salt forms. Complete conversion to the crystalline form generally takes place within 1.5 hours, but the solvent is allowed to remain in contact with the salt for 3 hours although treatment for as long as six hours causes no adverse effects on the product. When dry ethyl ether is used as the crystallization solvent in the same proportion as above and under the same conditions, the thiopental salt soon forms a solid mass or cake which, however, can be readily broken up into a fine powder with agitation and which after remaining in contact with the solvent for about 48 hours, is completely converted to the crystalline form as evidenced by its uniformly white, granular appearance.

The rate at which the said thiobarbiturates, such as thiopental sodium, is precipitated in the substantially non-hygroscopic, crystalline form is also affected by the concentration of the thiopental in the particular crystallization solvent used. Thus, when amorphous thiopental sodium is treated with dry ethyl acetate in a ratio of one gram of the thiopental to 20 ml. of ethyl acetate, it requires one week to effect the desired precipitation in the crystalline form. When about 5 ml. of dry ethyl acetate is used for every gram of thiopental sodium, precipitation in the crystalline form is complete within about 3 hours. With dry ethyl ether being used at a ratio of 100 ml. ether to one gram of amorphous thiopental sodium, one week is required to effect conversion to the crystalline form, but when one ml. of dry ethyl ether is used for every gram of thiopental, the conversion to a crystalline salt is completed in about 24 hours.

When the crystallization solvent used is one in which the thiopental salt is relatively insoluble, such as ethyl ether, the rate of conversion at any given concentration of thiopental in the solvent is very substantially increased by the addition of a fraction of 1% of a solvent in which the thiopental salt is relatively soluble, such as water or ethyl acetate. Large amounts of a solubilizing solvent, such as water, however, are not desirable and are detrimental to good yields of high-grade product. The addition of about 0.1% water to ethyl ether decreases the treating time required for complete conversion to the crystalline salt from about 48 hours to 2 hours without any adverse effect on yield or quality of product.

In a convenient method of operation, the amorphous salt of a therapeutically useful thiobarbiturate is contacted with the vapors of an alkyl ether, alkyl ketone or alkyl ester until the salt in the solid phase is uniformly white in appearance. The salt is then separated and dried to obtain the desired white, stable, crystalline, non-hygroscopic form.

The following specific examples are set forth for the purpose of illustrating the general principle of the invention and should not be considered as restricting the invention to the particular proportions or reagents used.

EXAMPLE 1

To 50 grams of dry amorphous thiopental sodium is added 300 ml. of dry ethyl ether. The container is stoppered and allowed to stand at room temperature. After about five minutes, the thiopental sodium forms a solid mass which is readily broken up into a fine powder by means of a stirring rod. After remaining about 72 hours in contact with the ethyl ether and during which time the container is occasionally swirled, the thiopental sodium has completely changed from its original yellowish color to a uniformly white, granular solid. The thiopental sodium is recovered by filtration and dried under vacuum at 50–60° C. until no trace of ether remains. The product thus obtained is substantially non-hygroscopic but dissolves very rapidly in water and can be exposed to the atmosphere without caking, or liquefying Microscopic and X-ray diffraction examinations show the thiopental sodium to be entirely crystalline in form.

EXAMPLE 2

To 200 grams of dry, thiopental sodium in a two-liter flask is added 1000 ml. of dry ethyl ether. The flask is stoppered and allowed to stand with occasional swirling. After a few minutes, the thiopental sodium forms a solid mass which can be broken up into a fine powder by means of a stirring rod. Treatment is continued for approximately 48 hours at room temperature at the end of which time the thiopental sodium is uniformly white in color. The thiopental sodium is recovered by filtration, washed with two 50 ml. portions of ethyl ether, and dried under vacuum at 50° C. until no trace of ether remains. The recovered product is substantially non-hygroscopic, non-deliquescent, and crystalline in form.

EXAMPLE 3

To 100 grams of dry, amorphous, thiopental sodium in a two-liter flask is added 500 ml. of anhydrous ethyl ether and the mixture agitated by swirling and shaking. After initial wetting of the thiopental sodium, the thiopental sodium hardens into a solid mass, which after about 10 minutes, can be readily broken up with a stirring rod to form a fine, granular precipitate. After standing, with occasional agitation, for about 48 hours at room temperature, the mixture is filtered through a sintered glass funnel and the fine, white precipitate is washed with two 100 ml. portions of dry ethyl ether. The product is then vacuum dried for about 48 hours at 50° C. to remove all traces of ethyl ether. Nitrogen gas is employed throughout the filtering and washing operations. The thiopental sodium thus recovered is non-hygroscopic and crystalline in form.

EXAMPLE 4

To 100 grams of dry, amorphous, thiopental sodium in a two-liter flask is added 1000 ml. of ethyl ether containing 0.1 by volume water. The thiopental sodium is allowed to remain in contact with the ethyl ether containing the 0.1% water for a period of two hours at room temperature after which the fine, white precipitate of thiopental sodium is filtered, washed with ethyl ether, and dried as in the preceding example. The product thus treated is found on X-ray examination to be entirely crystalline in form and to possess the same improved physical and chemical characteristics as the products of the preceding examples.

It is apparent from the preceding example that the inclusion of a small percentage of water in the ethyl ether crystallization solvent very substantially decreases the time required for the complete conversion of the amorphous thiopental sodium to the non-hygroscopic, crystalline form. Results similar to that of Example 4 are obtained when the water content of the ethyl ether is between about 0.001% and 0.1% by volume. When the ethyl ether contains substantially less than 0.001% water, the time required for complete conversion of the thiopental sodium to the crystalline form is about the same as when no added water is present, approximately 48 hours. When large amounts of water up to a saturated solution are used in the ethyl ether crystallization solvent, however, the thiopental salt which precipiates from solution is of lower quality than is obtained from solutions containing between .001% and .1% added water.

The amorphous thiopental sodium used in the preceding examples, prior to being treated, generally analyzes between about 96.5% and 98.5% pure. After crystallization in accordance with the preceding examples, the product analyzes about 100% pure and invariably is increased in purity significantly above the starting amorphous thiopental sodium.

EXAMPLE 5

To one gram of amorphous sodium 5-allyl-5-(1-methylbutyl)-2-thiobarbiturate (thiamylal sodium) in a suitable container was added 10 ml. of dry ethyl ether and the closed container agitated at frequent intervals for 48 hours until the solid appeared white. The white precipitate was filtered and dried in a vacuum oven at 70° C. for about 28 hours. The product obtained was crystalline and did not liquefy on exposure to 50% relative humidity for 72 hours.

EXAMPLE 6

To one gram of amorphous sodium 5-($\Delta^2$-cyclohexenyl)-5-allyl-2-thiobarbiturate (thialbarbitone sodium) in a suitable container was added 10 ml. of dry ethyl ether and the closed container agitated at frequent intervals for 48 hours and until the solid appeared white. The white precipitate was filtered and dried in a vacuum oven at 70° C. for 28 hours. The product obtained was crystalline and did not liquefy on exposure to 50% relative humidity for 72 hours.

EXAMPLE 7

To 25 grams of dry, amorphous, thiopental sodium is added 250 cc. of ethyl acetate at room temperature. All the thiopental sodium dissolves in the ethyl acetate, but within about five minutes the acetate solution begins to appear cloudy. After about fifteen minutes, a fine, white precipitate forms. The mixture is placed in a cold room of —4° C. overnight. The precipitate is filtered under nitrogen and dried under vacuum at 70° C. for about 48 hours. The white, crystalline, thiopental sodium is non-hygroscopic and non-deliquescent. The starting amorphous thiopental sodium assayed 98.1% pure and the crystalline product obtained assayed 100.9% pure.

EXAMPLE 8

To 75 grams of dry, amorphous, thiopental sodium is added 750 cc. of dry, ethyl acetate at room temperature. The mixture is agitated frequently in order to insure complete solution of the amorphous thiopental sodium, since precipitation of the fine, white, crystalline, thiopental sodium begins to form before all the amorphous material is dissolved. Complete conversion to the crystalline form takes place within about three hours. The precipitate is filtered and washed with ethyl ether (or ethyl acetate) using about 5 ml. of solvent per gram of precipitate. The ethyl acetate filtrate can be reused for additional treatments of amorphous, thiopental sodium with substantial increases in yields being obtained. The crystalline, thiopental sodium is dried in a vacuum oven at 70° C. Microscopic and X-ray examination show the product to be crystalline in form and non-hygroscopic.

EXAMPLE 9

The effect on the rate of precipitation of a crystalline product by the inclusion of a small percent by volume of dry ethyl ether in the ethyl acetate crystallization solvent is demonstrated by treating one gram of dry, amorphous, thiopental sodium with 10 cc. of dry ethyl acetate containing the indicated percent by volume of dry ethyl ether and observing the solution after 5 minutes, 15 minutes, 1.5 hours and 48 hours of treatment.

*Table 1*

| Added Vol. Percent of Anhydrous Ethyl Ether | 5 Min. | 15 Min. | 1.5 Hrs. | 48 Hrs. |
|---|---|---|---|---|
| 0 | Clear Soln | Slight White Ppt. | Heavy White Ppt. | Heavy Ppt. All White.[1] |
| 1.0 | Hazy Soln | Massive Ppt. All White. | All White | All White. |
| 0.1 | Clear Soln | Slight White Ppt. | More White Ppt. | Heavy Ppt. All White. |

[1] "All White" indicates completely crystalline non-hygroscopic product.

EXAMPLE 10

The effectiveness of a lower alkyl ketone as a crystallization solvent for the amorphous thiobarbiturates, such as thiopental sodium, is demonstrated by treating one gram of thiopental sodium in a small vial with the specified volume of methylpropyl ketone as indicated in Table 2. The closed vial is shaken and observed frequently. At the end of the indicated period of treatment, the product is filtered, rinsed with dry ether and vacuum dried for 24 hours at 70° C. The product in each instance is examined to determine its crystallinity and hygroscopicity.

*Table 2*

| Crystallization Solvent (cc./gram salt) | Appearance of Solution After 1.5 Hrs. Treatment | Form of Recovered Product After Exposure to 50% Relative Humidity for 6 Hours |
|---|---|---|
| 10.0 cc. methylpropyl ketone. | Heavy White Ppt | White, Crystalline, Free-Flowing Solid. |
| 5 cc. methylpropyl ketone. | Heavy White Gel-Like Thixotropic Ppt. | Do. |

Microscopic and X-ray diffraction analysis of the thiopental sodium used as the starting material for each of the foregoing specific examples show that the thiopental sodium is essentially isotropic and has only one broad X-ray diffraction band centered at 4.1 A. which clearly establishes the starting material as being completely amorphous.

Microscopic examination of the product of the foregoing specific examples shows that the thiopental sodium obtained is in the form of many small anisotropic crystals, which, when examined by X-ray diffraction analysis, exhibit many sharp lines which show the product to be crystalline.

The X-ray diffraction analysis of the products of Example 1 and Example 7 are identical. The $d$-spacings and the relative intensities of the X-ray diffraction pattern obtained on examining the products of Examples 1 and 7 are shown in the following Table 3:

*Table 3*

X-RAY DIFFRACTION PATTERN OF CRYSTALLINE PENTOTHAL® SODIUM

| d-Spacing, A. | Est. Rel. Int. |
|---|---|
| 12.7 | 10 |
| 11.6 | 2 |
| 9.4 | 2 broad |
| 7.6 | 2 |
| 7.2 | 5 |
| 6.8 | 2 |
| 6.3 | 5 |
| 6.0 | 1 |
| 5.79 | 3 |
| 5.43 | 6 |
| 4.86 | 5 |
| 4.61 | 4 |
| 4.23 | 3 |
| 4.09 | 3 |
| 3.95 | 2 |
| 3.84-3.69 | 7 broad |
| 3.59 | 4 |
| 3.44 | 2 |
| 3.37 | 2 |
| 3.19 | 2 |
| 3.08 | 1 broad |
| 2.91 | 3 broad |
| 2.71 | 4 broad |
| 2.60 | 1 |
| 2.48 | 2 |
| 2.43 | 1 |
| 2.36 | 3 |
| 2.32 | 1 |
| 2.24 | 2 broad |
| 2.12 | 1 broad |
| 1.94 | 1 broad |
| 1.88 | 1 broad |
| 1.74 | 2 |

The X-ray diffraction patterns are obtained on photographic film using nickel filtered Cu $K_\alpha$ ($\lambda$=1.5418 A.) with a standard G.E. powder camera of 7.16 cm. radius which permits detection of $d$-spacings up to 20 A. Careful precautions are taken to obtain representative samples. When examining the amorphous material, extreme precautions are taken to maintain the said samples dry and the samples are ground in air of 24% relative humidity, packed immediately into end-sealed, glass, capillary tubes into which is introduced a layer of "Drierite" powder and the tube sealed. The X-ray exposures are made immediately and after exposure the samples are still dry by microscopic examination.

EXAMPLE 11

A 2.5 gram sample of amorphous thiopental sodium is placed in a 25 ml. wide-mouthed bottle supplied with an inlet and outlet tube which is mounted on a 60-cycle vibrator. A stream of methyl ethyl ketone vapor is pumped through the sample with constant vibration at a flow rate of 40 ml. per minute until the sample turns white. This requires about 6 hours. The solid is then removed and dried at 65° C. under vacuum to constant weight. X-ray diffraction shows that the solid has been converted to crystalline thiopental sodium.

This application is a continuation-in-part of my co-pending application, U.S. Serial No. 674,051, filed July 25, 1957, now abandoned.

Others may readily adapt the invention for use under various conditions of service, by employing one or more of the novel features disclosed or equivalents thereof. As at present advised with respect to the apparent scope of my invention, I desire to claim the following subject matter.

I claim:

1. A method of transforming an amorphous sodium salt of a therapeutically useful thiobarbiturate selected from the class consisting of thiopental, thiamylal, and thialbarbitone into a stable, white, non-hygroscopic, crystalline salt which comprises contacting said amorphous salt with an organic compound selected from the group consisting of ethyl ether, ethyl acetate, diethyl ketone, methyl ethyl ketone, methylpropyl ketone and mixtures thereof and allowing the said organic compound to remain in contact with the said amorphous salt until the salt in the solid phase is uniformly white in appearance and thereafter separating the white solid and drying to obtain a stable, white, non-hygroscopic, crystalline salt.

2. A method as claimed in claim 1 wherein the amorphous salt is contacted with the organic compound in the vapor phase.

3. A method of transforming an amorphous sodium salt of thiopental into a stable, white, non-hygroscopic, crystalline salt which comprises slurrying said amorphous salt with ethyl ether until the salt in the solid phase is uniformly white in appearance and thereafter separating the white solid and drying to obtain a stable, white, non-hygroscopic, crystalline salt.

4. A method of transforming an amorphous sodium salt of thiopental into a stable, white, non-hygroscopic, crystalline salt which comprises dissolving said amorphous salt in ethyl acetate, allowing the resulting solution to stand until a white solid precipitates and thereafter separating the white solid and drying to obtain a stable, white, non-hydroscopic, crystalline salt.

5. A method of transforming an amorphous sodium salt of thiopental into a stable, white, non-hygroscopic, crystalline salt which comprises contacting said amorphous salt with methyl ethyl ketone in the vapor phase until the salt in the solid phase is uniformly white in appearance and thereafter drying the white solid to obtain a stable, white, non-hygroscopic crystalline salt.

References Cited in the file of this patent

UNITED STATES PATENTS 2,293,770     Shonle et al. _____ Aug. 25, 1942

FOREIGN PATENTS 720,826     Great Britain _____ Dec. 29, 1954

OTHER REFERENCES

Pharmacopoeia of the United States of America, 13th Revision (U.S.P. XIII), Mack Publishing Co. (1947), page 572.

The Merck Index, pages 949 and 952, 6th edition, 1952.